Feb. 2, 1971 J. F. KILBORN ET AL 3,560,402
APPARATUS FOR MECHANICALLY BREAKING STABLE FOAMS
Filed April 10, 1968 3 Sheets-Sheet 3
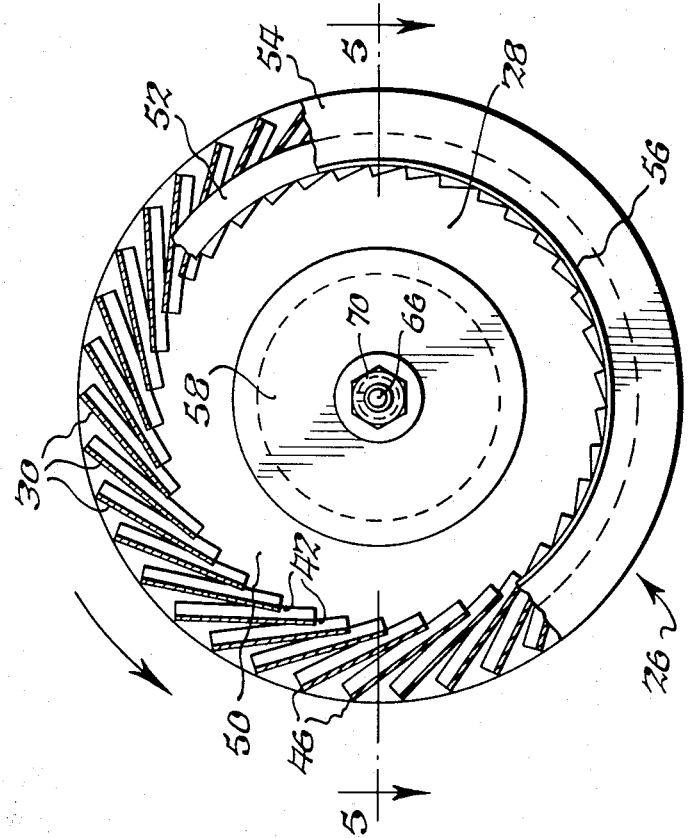
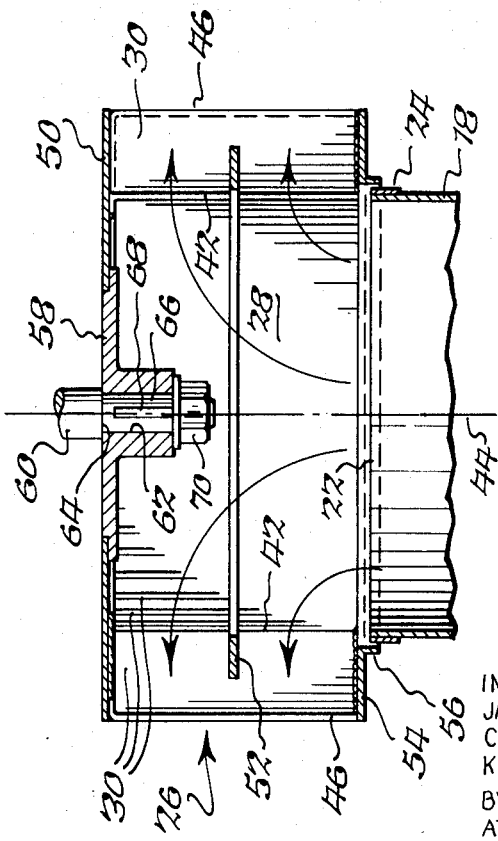
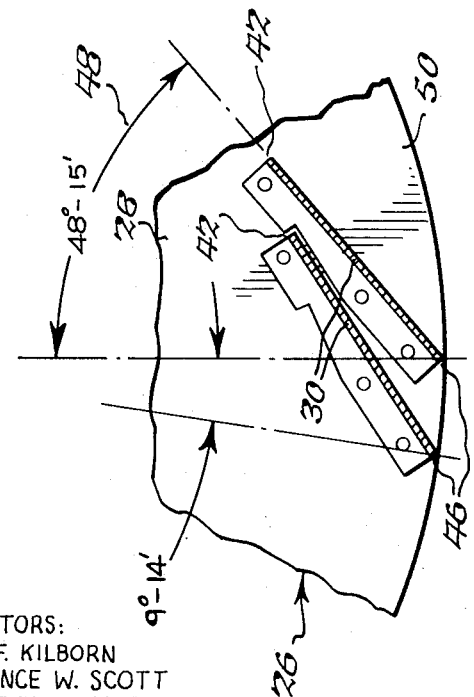
INVENTORS:
JACK F. KILBORN
CLARENCE W. SCOTT
KENNETH W. HOBBS
BY *Howard R. Goldberg*
ATTORNEY

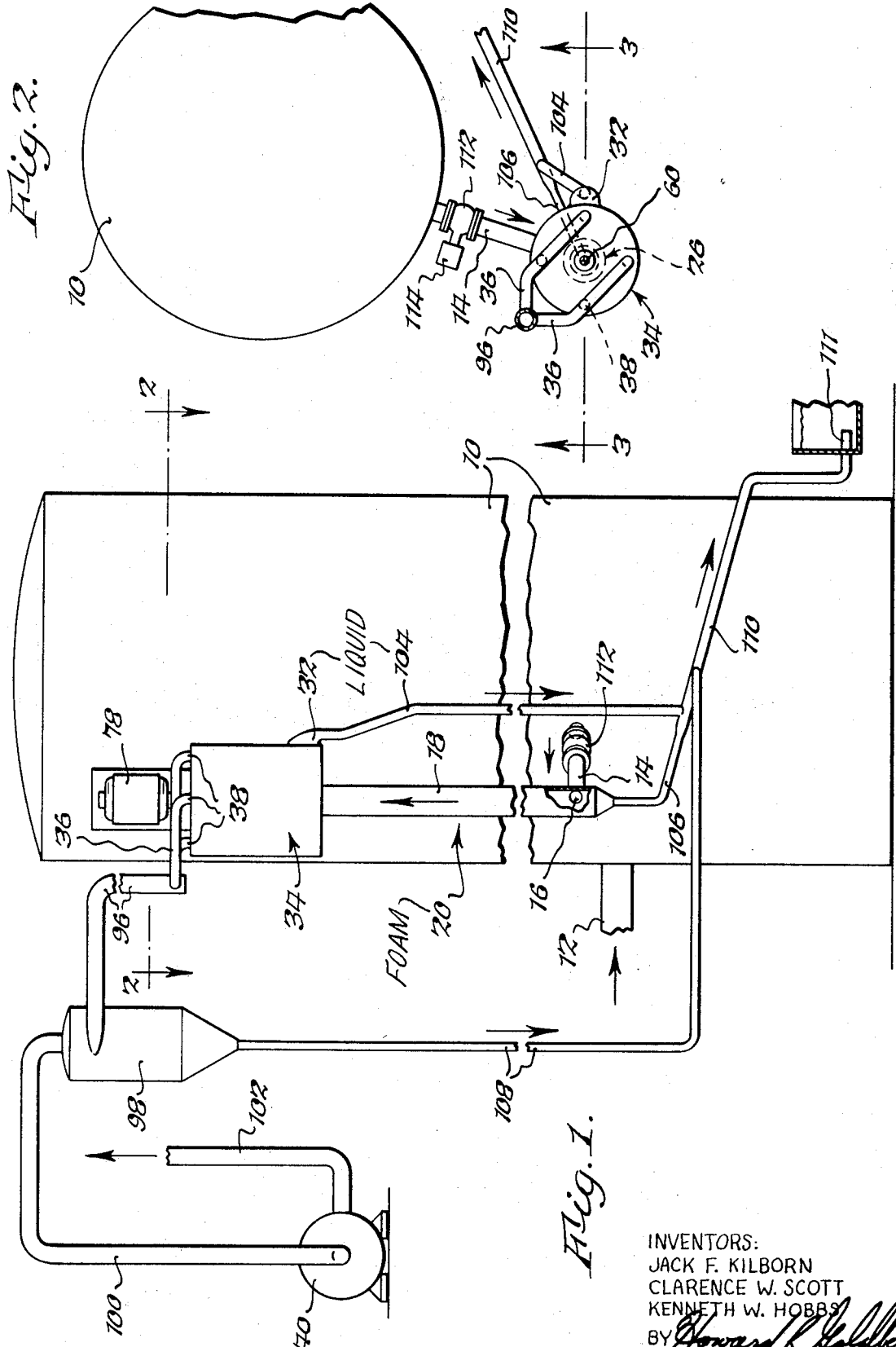

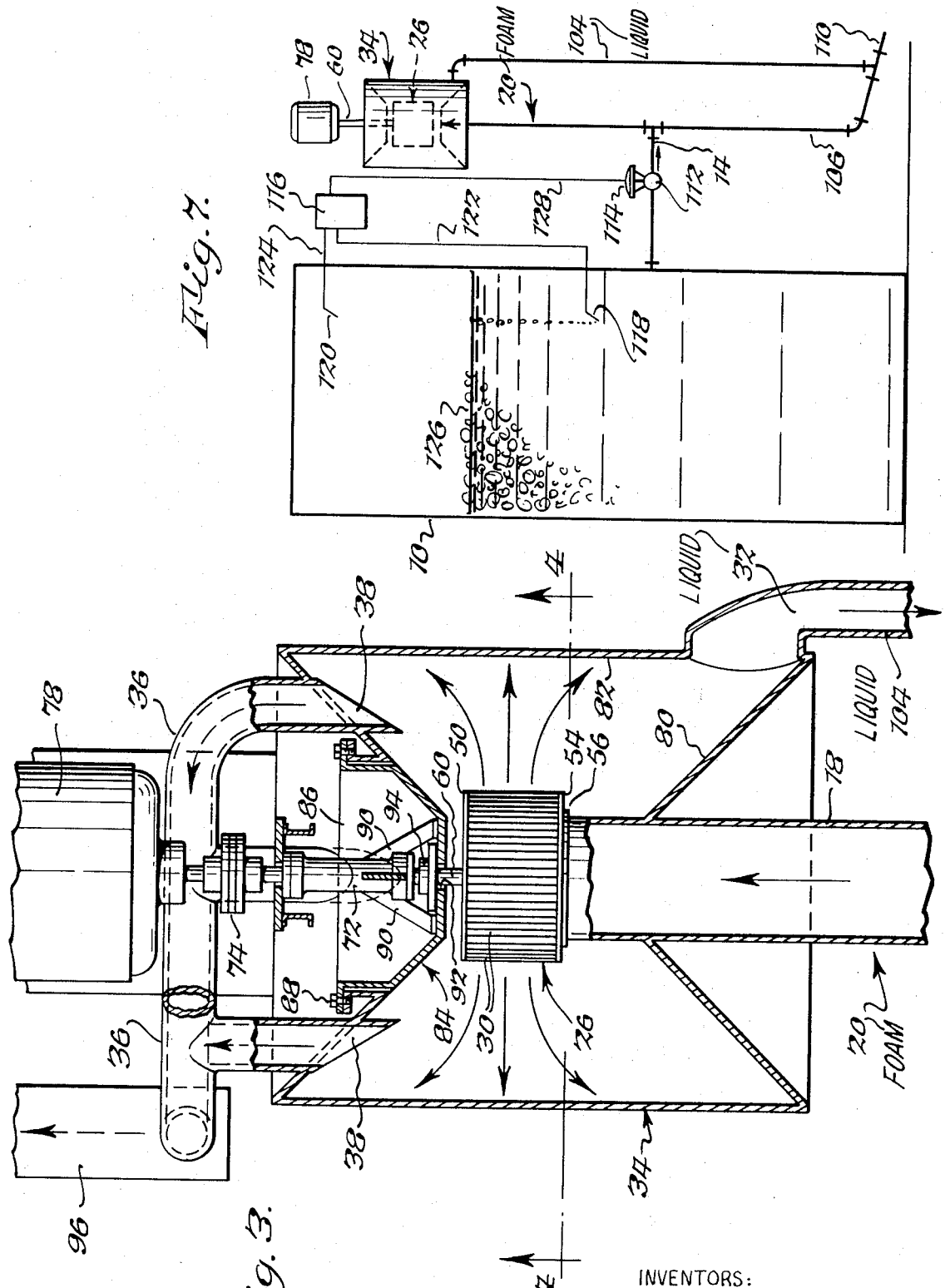

United States Patent Office 3,560,402
Patented Feb. 2, 1971

3,560,402
APPARATUS FOR MECHANICALLY BREAKING STABLE FOAMS
Jack F. Kilborn, Natchez, Miss., Clarence W. Scott, Panama City, Fla., and Kenneth W. Hobbs, Springhill, La., assignors to International Paper Company, New York, N.Y., a corporation of New York
Filed Apr. 10, 1968, Ser. No. 720,092
Int. Cl. B01d 19/00
U.S. Cl. 252—361                     5 Claims

ABSTRACT OF THE DISCLOSURE

A stable foam of bubbles is expanded and drawn by a vacuum source through a riser and into a mechanical foam breaker. The breaker reduces the expanded foam to its liquid and gaseous components and disperses the liquid as discrete droplets against the walls of an enclosing chamber. The walls are spaced from the breaker to prevent mechanical agitation of the liquid collected after separating it from the dispersed liquid. The liquid is drained from the chamber by gravity through a barometric leg.

---

The instant invention relates, generally to methods and apparatus for breaking a foam of bubbles and, more particularly to methods and apparatus for subjecting foam to the combined effect of a partial vacuum and mechanically applied impact and shear forces for the purpose of reducing the foam to its liquid and gaseous components.

Unwanted foams that develop in the processing of chemicals and the operation of process equipment have long presented considerable difficulties. Their elimination often requires large expenditures in the form of holding tanks and related equipment as well as large amounts of power to run the present inefficient foam breakers. While foaming is often a highly effective chemical treatment, particularly for separating various components from a mixture of liquids or a mixture of liquids and solids, as in the separation of soap from the black liquor produced in the manufacture of pulps by the kraft process, an otherwise desirable process, sometimes becomes uneconomical because of the quantities of foam created and the expense necessary to reduce the foam to its components. Furthermore, the release of industrial wastes in the form of stable foams into rivers and other bodies of water present an economic loss both in terms of the materials and in terms of pollution.

The instant invention comprises foam-breaking apparatus which effectively deals with stable foams and economically reduces them to their component parts with a minimum expenditure of power as well as a minimum of equipment. Due to its high efficiency and the fact that it can be scaled to handle any conceivable volume of foam, the foam-breaker of the instant invention effectively copes with the deliberate beneficial creation of foam in any quantity desired, thereby permitting the use of heretofore uneconomical processes which rely on foaming. In addition the component part reclamation is now greatly facilitated by the instant invention.

Mechanical foam breakers generally combine one or more of the following effects to break foam: Rapid pressure change, shear force, compression force and impact force. An example of the use of rapid pressure change is the acoustic foam breaker which uses intensive sound, e.g., .7 or 1.1 kc. at 150 db. These acoustic breakers as reported in an article entitled "Mechanical Foam Breakers" by Morris Goldberg and Eliezer Rubin in vol. 6, No. 2, April 1967 of Industrial and Engineering Chemical Process Design and Development, pages 195 through 200, published by the American Chemical Society, require excessive amounts of 40 to 60 p.s.i. driving air and have maximum defoaming rates of 10 cubic feet per minute. Also they require approximately 3 cubic feet of air supplied to the sound source for each cubic foot of foam broken. Shear, compression and impact force have been utilized in various paddle and impeller configurations as well as in various centrifugal basket and plate arrangements, but have as yet been incapable of dealing effectively with very large quantities of industrial foam. These mechanical breakers all suffer from a very large power requirement in relation to their foam-breaking capabilities.

The independent use of vacuum has been suggested as a means of breaking foam, but a very high vacuum source is required which is expensive to build and operate, particularly when an attempt is made to break highly stable wet foams. These foams require very large vessels since the foams have great capacity to expand without bursting when a vacuum is applied. Also entrained air, in the form of tiny bubbles which cling to solid particles, is often used to float these particles to facilitate their removal. A high vacuum which has the effect of substantially degassing the liquid seriously inhibits this desirable floatation effect. The use of vacuum in conjunction with various other types of mechanical breakers has also been suggested. In the case of the sonic breaker used in combination with a vacuum, the two operate as cross purposes, since a large amount of sonic signal source gas must be continuously eliminated to maintain the vacuum and the effectiveness of the shock waves are substantially reduced in the rarified medium in which they must work.

In the instant invention, by contrast, vacuum has been effectively combined with a unique mechanical foam breaker to produce a technique and apparatus offering tremendous foam-breaking capability combined with low power requirements.

In general, the invention comprises a foam storage tank in which a desired head of foam is maintained to provide a continuous flow of foam to the foam breaker. Foam is withdrawn from this tank by vacuum through a riser leading to the foam breaking chamber. At the top of the riser, the foam is pulled into the breaking chamber by the vacuum through a revolving squirrel cage type breaker. As the bubbles which comprise the foam travel up the riser, they are subjected to an increasing vacuum and, accordingly, they expand. The bubbles which do not break under the influence of the vacuum alone are rendered substantially more fragile since their liquid component must provide substantially more surface area as they expand. The expanded bubbles are then broken by a combination of impact againts the blades and shear forces along the surface of the blades. As the foam enters the breaker the angular acceleration imparted by the breaker presses the foam against the blade surfaces. Centrifugal force also drives the foam radially along the blade surface. The shear force created by the surface tension of the liquid on the blade surfaces causes the liquid from the bubbles to be drawn off the surface of the bubbles onto the blades. When enough liquid is drawn out of the surface of the bubbles, they can no longer sustain themselves and they burst, liberating their gaseous component and depositing the remainder of their liquid component on the blade surfaces. The liquid is spun off the blades by centrifugal force in the form of discrete droplets and travels to the walls of the breaking chamber where it is collected and drained.

The configuration of the breaking chamber is such that the walls of the chamber which surround the breaker are spaced a considerable distance from the breaker and the vacuum is drawn on the breaker at a point outside the breaker blades. This configuration insures several important conditions. First, liquid leaving the spinning breaker cannot reform into a body adjacent the breaker blades. A body of liquid adjacent the breaker blades would be stirred up at the rim of the breaker thus creating new foam. Second, the gas liberated from the foam can be withdrawn from the breaking chamber while the liquid is dispersed in the form of discrete droplets. A body of liquid adjacent the breaker blades would block passage of the withdrawn gas causing it to bubble through the liquid which would create new foam. Third, an increasing vacuum gradient is maintained between the inside and outside edges of the breaker blades. This is significant because it maintains continued expansion of the bubbles as they pass along the breaker blades and thus contribute to the increased fragility and breakage of the bubbles.

It is therefore an object of the present invention to subject foam to a decreasing pressure gradient prior to and throughout the further step of mechanically inducing high impact and shear forces to the foam to economically break large volumes of stable foam to its component parts.

It is another object of the instant invention to provide a method and apparatus for breaking foam which will expand the foam to make it more fragile, mechanically break the foam into its liquid and gaseous components, and then separate the components without reforming the foam.

Having generally described the instant invention, reference is now made to the drawings which show a preferred embodiment, it being understood the instant invention is limited only by way of the scope of the claims appended hereto and is not limited to the specific embodiment as set forth in the drawings and following description which is merely an example.

FIG. 1 is an elevation view of the apparatus used to carry out the instant invention.

FIG. 2 is a partial cross-sectional view of the apparatus of FIG. 1 taken at line 2—2 showing header and piping details.

FIG. 3 is a cross-sectional view of the foam breaking chamber portion of the apparatus of FIG. 1 taken at line 3—3 (FIG. 2) illustrating the relationship of the mechanical foam breaker to the chamber.

FIG. 4 is a cross-sectional, broken away view of the foam breaker of the instant invention taken at line 4—4 (FIG. 3).

FIG. 5 is a partial cross-sectional view of the breaker of FIG. 4 taken at line 5—5.

FIG. 6 is a partial cross-sectional detail of the blades of the breaker of FIG. 4.

FIG. 7 is a schematic diagram of part of the instant invention showing the level control system.

Referring now to FIGS. 1 and 2, foam from a source (not shown) is introduced through a feeder pipe 12 into foam tank 10 where it is maintained by a control system (later described) at a desired level above conduit inlet 16. The foam passes from the tank through pipe 14, through inlet 16 and into the first section 18 of conduit 20 which is a riser. The foam is drawn up the riser to riser outlet 22 (FIG. 5). The foam proceeds axially into cavity 28 (FIG. 5) of the mechanical foam breaker 26 and then radially out into breaker blades 30 (FIG. 4) where it is reduced to its liquid and gaseous components.

The liquid component is spun off the breaker blades in the form of discrete droplets into the second section 34 of conduit 20 which is a vacuum chamber. The droplets are arrested by and drain down the walls of the chamber, collected in the vacuum chamber and drained through outlet 32 (FIG. 3).

The gaseous component is drawn from the breaker into chamber 34 and out of the chamber through outlets 38 by vacuum source 40 which may be any conventional vacuum pump of suitable size and capacity. This vacuum source is also responsible for drawing foam from the tank 10 through riser 18 and into the breaker 26.

The mechanical foam breaker 26 is similar to a squirrel cage blower. Blades 30 are flat and rectangular and are arranged cylindrically around the periphery of the blower. Each blade is offset from the radial by essentially the same lead angle 48 (FIG. 6). The leading edges 42 of the blades are parallel to axis 44 (FIG. 5) of the blower and collectively define the circumference of cavity 28. The trailing edges 46 are also parallel to the axis 44 of the blower and collectively define the outside circumference of the blower.

Rings 50 and 54 define the top and bottom of the blower respectively and provide support for the blades which are rigidly attached to the rings by welding or any other conventional means. Ring 54 is provided with a depending lip 56 on its inner circumference. This lip acts with hoop 24 surrounding the riser outlet to form a sealing gland between the outlet of the riser and the cavity 28 of the blower. Ring 52 provides further support for the blades at their mid-section. Ring 50 is attached to hub 58 which axially accepts driving shaft 60 through bore 62. Hub 58 is fixedly attached to shaft 60 by any conventional means such as shoulder 64 which abuts hub 58, threaded stud 66 which passes through the hub, and key 68 and nut 70 which lock the shaft to the hub.

Foam breaker 26 is rotated by shaft 60 which is supported by any conventional bearing system 72 (FIG. 3). Shaft 60 is rotated through coupling 74 by motor 78.

Chamber 34 is provided with a conical bottom wall 80, cylindrical side wall 82, and conical top wall 84. Bottom wall 80 provides drainage into outlet 32 as well as spacing from breaker 26. Top wall 84 provides spacing from breaker 26 and is provided with hatch 86 secured thereto in sealed relationship by any conventional fastener means such as bolts 88. Hatch 86 is provided with bearing support means 90 which supports the bearing 72. It is further provided with a hole 92 permitting passage of shaft 60 and any conventional sealing gland 94 to maintain the chamber in a sealed state with respect to atmosphere. Cylindrical side wall 82 is spaced from breaker 26 a distance sufficient to provide for removal of the gaseous component of the foam from the chamber while the liquid component is still in a dispersed state as it travels in the form of discrete droplets from the outer circumference of the breaker to the wall 82. When the droplets of the liquid hit wall 82 their flight from the breaker is arrested and they drain down the wall and are removed by gravity through outlet 32. From the spacing provided, it can be seen that a body of the liquid cannot form adjacent the breaker. If the walls 82 were placed closely adjacent the breaker a buildup of liquid on the wall could take place which would be severely agitated by the breaker. However, with the configuration of the instant invention agitation of the liquid as a body is prevented and there is no tendency to reform foam at the periphery of the breaker. Also the gaseous component can be removed from the entire vertical length of the breaker without having to bubble through a body of the liquid adjacent the breaker or between the breaker and the surrounding walls. On the contrary, with the instant invention the gaseous component is drawn from the breaker and passes around the discrete droplets. The droplets are of a size determined by the energy imparted by the breaker and the surface tension of the liquid component and thus cannot be penetrated by the gas. In this manner reformation of foam by gas passing through the liquid is also prevented.

When removing the separated gaseous component from the chamber a certain amount of liquid is inevitably drawn off as well. This is separated by a conventional eliminator such as cyclone eliminator 98 (FIG. 1) which receives the gas from manifold 36 through conduit 96, removes any entrained liquid and exhausts the gas through conduit 100 to vacuum source 40 which in turn exhausts the gas to atmosphere through conduit 102. A drain system is provided which comprises conduit 104 which drains the chamber outlet 32, conduit 106 which drains the riser, and conduit 108 which drains the eliminator. These drains feed into a main drain conduit 110 which conducts the liquid component to storage or to further processing (not shown).

Since the elements being drained are located high above the outlet 111 of drain 110 the various drains act as barometric legs and thus permit drainage by gravity of the liquid components while still maintaining the desired vacuum in the foam breaking system. It should be understood that while barometric legs are used, any other removal means, such as pumps which will maintain the desired vacuum, may be used. An examination of the riser shows that its drain connects at a point considerably below the chamber and eliminator drain. Since the foam is much lighter than its separated liquid component the vacuum in the system will easily lift the foam up the riser while liquid from bubbles that burst during expansion in the riser will drain down the riser and into the drainage system.

FIG. 7 illustrates the control system used to maintain foam in the foam tank 10 at a desired level above conduit inlet 16. The foam may be fed into the tank 10 at varying rates and densities depending upon the conditions of the process producing the foam. The valve 112 in feeder pipe 14 controls the flow of foam tank to the riser. It is in turn controlled by the controller 114 which is operated by differential pressure sensor 116. This sensor receives pressure signals through pneumatic lines 122 and 124 from back pressure sensors 118 and 120 respectively which are located in tank 10. Pressure sensors 118 and 120 are fed air from the same source (not shown). Sensor 118, which is located below the foam level 126, bubbles air through the foam. The foam above the head 118 as well as the pressure in the tank create a certain back pressure in sensor 118. Sensor 120 which is located above the level 126 senses the pressure in the tank. Sensor 116 differentiates these signals and determine the head above sensor 118 in terms of a pressure. This provides a control signal to controller 114 through pneumatic line 128 which is proportional to the height and density of the foam above sensor 118, opening the valve 112 as the head or density increases and closing the valve as head or density decreases. Thus a level is maintained, depending upon the set point of controller sensor 116, which will assure a continuous flow of foam from the tank.

The various values assigned to the parameters listed below illustrate an actual installation of the instant invention. They are set forth merely as an example and are in no way intended to limit the invention to something narrower than the scope of the broadest claim.

A riser of 24" pipe, 36.5 feet high is connected to a chamber 7.5 feet in diameter. The breaker used is 20 inches high, has a 35 inch outside diameter and has 27 blades, each measuring 7 inches by 19 inches, which are equally spaced around the wheel and which have a lead angle from the radial of 48 degrees. The motor is driven by a 900 r.p.m., 100 h.p. electric motor. The vacuum source has a capacity of 900 c.f.m. at 20 inches vacuum and is driven by a 50 h.p. electric motor. The unit has a capacity of at least 500 c.f.m. of foam having a density of .7 lb. per gallon which it reduces to 400 gallons of liquid component per minute having a density of 6.5 lbs. per gallon. A head equivalent to approximately 20 inches of water is maintained in the foam holding tank above the conduit inlet. It should be understood that since the foam is considerably lighter than water the actual head of foam is considerably more than 20 inches. The unit described has at least the foam breaking capacity of 10 Roto-clone Type W., Size #20 dynamic precipitators. These precipitators are described in the American Air Filter Company, Inc. Dust Control Bulletin No. 274–c. Although the Roto-clone equipment is intended for precipitation of dust from a gaseous carrier, prior to the instant invention, it provided the most effective commercially available means of breaking stable foam. In the installation the parameters of which are set forth above, the indicated number of Roto-clones have been replaced. Furthermore, although the Roto-clones were the best equipment available, they were not fully acceptable since large amounts of light foam persisted at their discharge. The foam breaker of the instant invention, however, is capable of completely breaking the foam down to the desired density. Each of the Roto-clones replaced was powered by a forty (40) horsepower motor and in some cases were equipped with corrosion resistant impellers. Thus, it can be seen that there is a savings experienced of at least 250 operating horsepower over conventional mechanical foam breakers for a foam breaking capacity of 500 cubic feet per minute, as well as a greatly reduced installation and maintenance problem, since only one unit of the instant invention is capable of replacing 10 conventional units. It has also been found that the various parameters can be scaled proportionally to provide greater or smaller capacity and that the capacity of the unit described above can be further increased by increasing the capacity of the vacuum source.

What is claimed is:

1. Apparatus for reducing a foam of bubbles to its liquid and gaseous components comprising:
   (I) conduit means which:
      (A) define a flow path for said foam to travel,
      (B) comprise:
         (1) a first section comprising:
            (a) an inlet,
            (b) an outlet spaced above said inlet,
            (c) riser means between said first section inlet and said first section outlet for subjecting at least a portion of said foam to a barometric pressure gradient,
         (2) a second section which comprises a chamber which:
            (a) communicates with said first section at said first section outlet,
            (b) has a first outlet adapted to remove the gaseous component spaced above said first section outlet,
            (c) has a second outlet adapted to remove the liquid component spaced below said first section outlet,
   (II) mechanical breaker means which:
      (A) are juxtaposed said first section outlet,
      (B) commnicate with said first section at said first section outlet,
      (C) are adapted to receive foam from said first section through said first section outlet,
      (D) are adapted to subject said foam to impact and shear forces to reduce said foam to its liquid and gaseous components,
      (E) and are adapted to disperse said liquid component in the form of discrete droplets into said chamber,
   (III) vacuum means which:
      (A) communicate with said first chamber outlet,
      (B) and are adapted to maintain a decreasing pressure gradient along said flow path from said first section inlet to said chamber outlets for expanding said foam as it travels from said first section inlet,
   (IV) arresting wall means which:
      (A) are defined by at least a portion of said chamber,
      (B) are adapted to arrest said dispersed droplets,
      (C) are adapted to drain said droplets into said second chamber outlet,
      (D) and are adapted by sufficient spacing from said mechanical foam breaker to permit said vacuum means to remove said gaseous component while said liquid component is in a dispersed state, and
   (V) a first liquid component removal means communicating with said second chamber outlet for removing said liquid component from said chamber while said chamber is maintained under reduced pressure by said vacuum means, (VI) means for providing a continuous supply of foam to said breaker comprising:
- (A) a closed tank comprising:
    - (1) an inlet adapted to receive said foam,
    - (2) an outlet communicating with said first section inlet, and
- (B) control means for maintaining a desired head of foam in said tank above said first section inlet.

2. Apparatus of claim 1 wherein said foam breaker means comprise an impeller which:
- (I) has an axis of rotation,
- (II) and has a set of blades which:
    - (A) are spaced;
        - (1) equally from each other,
        - (2) and equally from said axis,
    - (B) define a cavity which:
        - (1) is concentric with said axis,
        - (2) and communicates with said first section at said first section outlet,
    - (C) and define a passage between said blades communicating with:
        - (1) said cavity,
        - (2) and second section.

3. Apparatus of claim 2 wherein said impeller comprises a squirrel cage blower wheel.

4. Apparatus for reducing a foam of bubbles to its liquid and gaseous components comprising:
- (I) conduit means which:
    - (A) define a flow path for said foam to travel,
    - (B) comprise:
        - (1) a first section having an inlet and an outlet spaced above said inlet,
        - (2) a second section which comprises a chamber which:
            - (a) communicates with said first section at said first section outlet,
            - (b) has a first outlet adapted to remove the gaseous component spaced above said first section outlet,
            - (c) has a second outlet adapted to remove the liquid component spaced below said first section outlet,
- (II) mechanical breaker means which:
    - (A) are juxtaposed said first section outlet,
    - (B) communicate with said first section at said first section outlet,
    - (C) are adapted to receive foam from said first section through said first section outlet,
    - (D) are adapted to subject said foam to impact and shear forces to reduce said foam to its liquid and gaseous components,
    - (E) and are adapted to disperse said liquid component in the form of discrete droplets into said chamber,
- (III) vacuum means which:
    - (A) communicate with said first chamber outlet,
    - (B) and are adapted to maintain a decreasing pressure gradient along said flow path from said first section inlet to said chamber outlets for expanding said foam as it travels from said first section inlet,
- (IV) arresting wall means which:
    - (A) are defined by at least a portion of said chamber,
    - (B) are adapted to arrest said dispersed droplets,
    - (C) are adapted to drain said droplets into said second chamber outlet,
    - (D) and are adapted by sufficient spacing from said mechanical foam breaker to permit said vacuum means to remove said gaseous components while said liquid component is in a dispersed state, and
- (V) liquid component removal means for removing liquid component separated from said foam in said apparatus while said apparatus is maintained under reduced pressure by said vacuum means which:
    - (A) comprise first barometric leg means communicating with said second chamber outlet for removal by gravity of said liquid component from said second chamber,
    - (B) comprise second barometric leg means communicating with said first section adjacent and below said first section inlet for removing liquid component separated from said foam as it expands in said first section.

5. Apparatus of claim 4 further comprising a secondary liquid component separation means between said first chamber outlet and said vacuum means for separating liquid component entrained in said gaseous component after it passes through said first chamber outlet said secondary liquid component separation means comprising a cyclone separator, said separator being provided with a third barometric leg.

References Cited

UNITED STATES PATENTS

| | | | |
|---|---|---|---|
| 1,818,962 | 8/1931 | Parsell | 55—199X |
| 3,018,843 | 1/1962 | Mercier | 55—178 |
| 3,339,345 | 9/1967 | Sebald et al. | 55—178 |
| 2,360,445 | 10/1944 | Quasebarth | 159—45 |
| 2,754,246 | 7/1956 | Brosamer | 196—8 |
| 3,327,763 | 6/1967 | Auchapt et al. | 159—44X |

FOREIGN PATENTS

| | | | |
|---|---|---|---|
| 38,993 | 7/1922 | Norway | 252—361 |
| 736,501 | 5/1943 | Germany | 252—361 |

NORMAN YUDKOFF, Primary Examiner

J. SOFER, Assistant Examiner

U.S. Cl. X.R.

55—87, 178; 259—8, 96